(12) United States Patent
Ellis

(10) Patent No.: US 10,147,320 B1
(45) Date of Patent: Dec. 4, 2018

(54) SELF-DRIVING VEHICLES SAFETY SYSTEM

(71) Applicant: Christ G. Ellis, Minneapolis, MN (US)

(72) Inventor: Christ G. Ellis, Minneapolis, MN (US)

( * ) Notice: Subject to any disclaimer, the term of this patent is extended or adjusted under 35 U.S.C. 154(b) by 0 days.

(21) Appl. No.: 16/000,296

(22) Filed: Jun. 5, 2018

Related U.S. Application Data

(60) Provisional application No. 62/610,737, filed on Dec. 27, 2017.

(51) Int. Cl.
| | |
|---|---|
| *G08G 1/123* | (2006.01) |
| *G08G 1/127* | (2006.01) |
| *G01S 13/86* | (2006.01) |
| *G01S 13/93* | (2006.01) |

(52) U.S. Cl.
CPC ............ *G08G 1/127* (2013.01); *G01S 13/865* (2013.01); *G01S 13/867* (2013.01); *G01S 13/931* (2013.01)

(58) Field of Classification Search
CPC .................................. G01S 1/00; G08G 1/00
See application file for complete search history.

(56) References Cited

U.S. PATENT DOCUMENTS

| | | |
|---|---|---|
| 5,973,618 A | 10/1999 | Ellis |
| 6,218,964 B1 | 4/2001 | Ellis |
| 6,356,210 B1 | 3/2002 | Ellis |
| 6,556,148 B2 | 4/2003 | Ellis |
| 7,042,345 B2 | 5/2006 | Ellis |
| 9,062,986 B1 | 6/2015 | Ellis |
| 9,492,343 B1 | 11/2016 | Ellis |
| 9,770,382 B1 * | 9/2017 | Ellis ........................ H04W 4/80 |
| 2014/0100771 A1 * | 4/2014 | Ekpar .................. G05D 1/0276 701/408 |

* cited by examiner

*Primary Examiner* — Shirley Lu

(57) ABSTRACT

Self-driving vehicles safety system, comprising synthesized and coordinated components and entities, including vehicles, pedestrians, and traffic control light mechanisms, exchanging information, employing lidar (light imaging detection and ranging), radar and intelligent computer-based decision support algorithm systems that analyze images and extract information, to provide safety and vehicle control, regulated and prioritized traffic, and reduced vehicle emissions.

2 Claims, 14 Drawing Sheets

SELF-DRIVING VEHICLES SAFETY SYSTEM

This application claims the benefit under 35 U.S.C. 119(e) of U.S. Provisional Patent Application No. 62/610,737 filed Dec. 27, 2017, which application is hereby incorporated by reference in its entirety into this application.

FIELD OF THE INVENTION

This application relates to self-driving vehicles and, more particularly, to safety systems for self-driving vehicles.

BACKGROUND OF THE INVENTION

The self-driving vehicles safety system assumes an inevitable and urgent need to introduce new and creative solutions for the protection and safety of pedestrians and vehicles in the evolving self-driving vehicles era. This present invention relates to providing safety and vehicle control, regulated and prioritized traffic, and reduced vehicle emissions.

SUMMARY OF THE INVENTION

Summary of the Invention as to Safety & Vehicle Control, Regulated & Prioritized Traffic, & Reduced Vehicle Emissions An object of the present invention is to provide safety and vehicle control, regulated and prioritized traffic, and reduced vehicle emissions.

Another object of the present invention includes components, including vehicle components, pedestrian components, and traffic control light mechanisms components.

Another object of the present invention is to provide processor enabled components.

Another object of the present invention includes entities, including radar and sensor-based systems, GPS, cell phone technologies, and Bluetooth and Java algorithm systems.

Another object of the present invention is to provide processor enabled entities.

Another object of the present invention is for traffic control light mechanisms to receive real time data from sensors and other data sources that monitor prioritized vehicles; compare data with predetermined standards, signal and sound warnings to local drivers and pedestrians, change local traffic control lights to red, and give "go-ahead" signals directly to prioritized vehicles in the order of their predetermined priorities and alert messages.

Another object of the present invention is to protect impaired individuals when crossing roadways from perceived danger, by broadcasting warnings and alert notifications; which can include warning lights, sounds, images, instructions, messages, displays, or any other form of warning.

Summary of the Invention as to Automatic Counting/Vehicle Emissions

Another object of the present invention is where "Continuous-wave radar can be used to illuminate and detect vehicles by techniques employing semiconductor tracer-diode surveillance utilizing one or two carrier frequencies and looking for reflections of the third harmonic." McGraw-Hill Encyclopedia of Science & Technology.

Another object of the present invention is to mitigate emissions levels by initiating dynamic traffic assignment, which will activate rerouting instructions based on traffic conditions as measured by automatic vehicle counts and expedited by the preempting of local traffic control lights.

Another object of the present invention is to provide dynamic vehicle counts and emissions detecting mechanisms to sense, identify and classify types and levels of emissions from each vehicle, having data relating to undesirable emissions levels, and having data relating the number of vehicles to such undesirable emissions levels.

Summary of the Invention as to Light Imaging Detection and Ranging (Lidar)

Another object of the present invention is to employ light imaging detection and ranging (lidar) to use laser light pulses to scan the environment, enabling vehicles to see other vehicles, pedestrians, traffic control lights and various obstacles on the road when driving.

Another object of the present invention is to emit laser pulses which move outwards in various directions until the signals reach an object, and then reflect and return to the receiver, wherein an inner processor saves each reflection point of a laser and generates a 3D image of any physical object.

Another object of the present invention is to detect the presence, direction, distance, and speed of a vehicle by sending out laser pulses of high-frequency waves that are reflected off the vehicle.

Another object of the present invention is to employ lidar systems to monitor prioritized vehicles, compare alert signals received and priority algorithms with predetermined standards, and give "go-ahead" directly to prioritized vehicles accordingly.

Another object of the present invention is to employ lidar to enable traffic control light mechanisms to recognize vehicles and pedestrians, so as to provide safety and vehicle control, regulated and prioritized traffic, and reduced vehicle emissions.

Other objects of the present invention, with respect to lidar, include the following:

to employ a lidar algorithm to scan the surroundings and plan a vehicle's behavior in order to avoid collisions with obstacles;

to exploit the Doppler principle and render the lidar system immune to interference from large stationary objects and slow-moving clutter;

to anticipate a crash when an obstacle or hazard is within 30 feet and to deploy air-cushion-type passive restraints and deploy an anti-skid system;

to sense an obstacle or hazard within 500 feet to govern automatic braking and headway control;

to employ the carrier power of an X-band Gunn-type solid-state oscillator, or similar advanced technology, to produce high output power to generate microwave frequencies and above;

to employ lidar, the safest and preferred choice between lidar and radar, when visibility is not limited;

to employ radar, the safest and preferred choice between radar and lidar, when visibility is limited;

to generate a lidar algorithm where the formula is: (1) Laser signals are emitted; (2) Laser signals reach an obstacle; (3) Signal reflects from the obstacle; (4) Signal returns to the receiver; and then; (5) A laser pulse is registered;

to employ a laser generated plan to move a vehicle as far to the right as is safe, allowing a priority vehicle to pass;

to enable the interchange of lidar and continuous-wave radar in the averting of harm to self-driving vehicles and the averting of collisions;

to employ lidar to anticipate and avert harm to the self-driving vehicle, around, over and under, and avert collisions;

to employ radar to anticipate and avert harm to the self-driving vehicle, around, over and under, and avert collisions;

to employ lidar and radar to overlap while visibility changes from not limited to limited and visa-versa;

to interchange between lidar and radar is automatic and continuous when a vehicle is in operation, and to enable fully automatic and functioning sensing whenever the engine is running.

Summary of the Invention as to Radio Detection Ranging (Radar)

Another object of the present invention is to employ continuous-wave radar to scan the environment, enabling vehicles to see other vehicles, pedestrians, traffic control lights and various obstacles on the road when driving.

Another object of the present invention is to employ continuous-wave radar to scan the environment, enabling traffic control light mechanisms to see vehicles and pedestrians, so as to provide safety and vehicle control, regulated and prioritized traffic, and reduced vehicle emissions.

Another object of the present invention is to detect the presence, direction, distance, and speed of a vehicle by sending out high-frequency continuous-waves radar that are reflected off the vehicle.

Another object of the present invention is to employ radar and sensor-based systems to monitor prioritized vehicles, compare alert signals received and priority algorithms with predetermined standards and give "go-ahead" directly to prioritized vehicles.

Another object of the present invention is to employ radar, which usually consists of a synchronized radio transmitter and receiver, to emits radio waves and process their reflections for display and is used especially for detecting and locating objects.

Other objects of the radar system include:

to scan the surroundings employing continuous-wave radar to plan a vehicle's behavior in order to avoid collisions with obstacles;

to exploit the Doppler principle, rendering the radar system immune to interference from large stationary objects and slow-moving clutter;

to anticipate a crash when an obstacle or hazard is within 30 feet and to deploy air-cushion-type passive restraints and deploy an anti-skid system;

to sense an obstacle or hazard within 500 feet to govern automatic braking and headway control;

to employ the carrier power of an X-band Gunn-type solid-state oscillator, or similar advanced technology, to produce high output power to generate microwave frequencies and above;

to employ radar, the safest and preferred choice between radar and lidar when visibility is limited;

to employ lidar, the safest and preferred choice between lidar and radar when visibility is not limited;

to employ a radar generated plan to move a vehicle as far to the right as is safe, allowing a priority vehicle to pass;

to employ radar to anticipate and avert harm to self-driving vehicles, around, over and under, and avert collisions;

to employ lidar to anticipate and avert harm to self-driving vehicles, around, over and under, and avert collisions;

to employ radar and lidar to overlap during visibility changes from not limited to limited and visa-versa;

to enable the interchange between continuous-wave radar and lidar, depending on visibility, to be automatic and continuous in the averting of harm to self-driving vehicles and the averting of collisions; and to enable fully automatic and functioning sensing whenever the engine is running.

Summary of the Invention as to Computer-Based Decision Support Algorithms

Another object of the present invention is to employ computer-based decision support algorithms to enable vehicles to recognize other vehicles so as to provide safety and vehicle control, regulated and prioritized traffic, and reduced vehicle emissions.

Another object of the present invention is to employ computer-based decision support algorithms to enable vehicles to recognize pedestrians so as to provide safety and vehicle control, regulated and prioritized traffic, and reduced vehicle emissions.

Another object of the present invention is to employ computer-based decision support algorithms to enable vehicles to recognize traffic control lights so as to provide safety and vehicle control, regulated and prioritized traffic, and reduced vehicle emissions.

Another object of the present invention is to employ computer-based decision support algorithms to enable traffic control light mechanisms to recognize vehicles and pedestrians, so as to provide safety and vehicle control, regulated and prioritized traffic, and reduced vehicle emissions.

Another object of the present invention is to employ computer-based decision support algorithms to locate the exact position of the threatening vehicle and activate a vehicle's control intervention system to avoid hitting another vehicle, a pedestrian, or an obstruction.

Another object of the present invention is to determine if a pre-collision safety restraint system will be deployed, and if a vehicle-anti-skid system will be activated, as well as vehicle-control intervention in the involved vehicles when an individual's life is threatened or a collision is imminent.

Another object of the present invention is to attach electronic tags to vehicles and roadside objects for the target mass information required to allow reliable pre-collision restraint deployment decisions.

Summary of the Invention as to Computer Vision Algorithms

Another object of the present invention is to employ a computer vision algorithms system to extract information, analyze images, and, if an individual's life is threatened or a crash is imminent, transmit electrical impulses to stop and/or shut-down all vehicle(s) receiving the electrical impulse and/or all involved vehicle(s), and/or take control of the threatening vehicle(s).

Another object of the present invention is to deal with how computers gain high-level understanding from digital images and videos by employing computer vision algorithms, which are concerned with the automatic extraction, analysis and understanding of useful information from a single image or a sequence of images, involving the development of a theoretical and algorithmic basis to achieve automatic visual understanding.

Another object of the present invention is to employ computer vision algorithms to enable vehicles to recognize other vehicles so as to provide safety and vehicle control, regulated and prioritized traffic, and reduced vehicle emissions.

Another object of the present invention is to employ computer vision algorithms to enable vehicles to recognize pedestrians so as to provide safety and vehicle control, regulated and prioritized traffic, and reduced vehicle emissions.

Another object of the present invention is to employ computer vision algorithms to enable vehicles to recognize traffic control lights so as to provide safety and vehicle control, regulated and prioritized traffic, and reduced vehicle emissions.

Another object of the present invention is to employ computer vision algorithms to enable traffic control light mechanisms to recognize vehicles and pedestrians, so as to provide safety and vehicle control, regulated and prioritized traffic, and reduced vehicle emissions.

Summary of the Invention as to Intelligent Video Monitoring and Video Analysis

Another object of the present invention is to employ the intelligent video monitoring and video analysis system to identify objects, analyze motion and extract video intelligence and, if an individual's life is threatened or a crash is imminent, transmit impulses to stop and/or shut-down all vehicle(s) receiving the electrical impulses and/or all involved vehicle(s), and/or take control of the threatening vehicle(s).

Another object of the present invention is to employ intelligent video monitoring and video analysis so as to provide safety and vehicle control, regulated and prioritized traffic, and reduced vehicle emissions.

Another object of the present invention is employ the intelligent video & digital image processing systems to recognize traffic signals & advise when it is safe for an individual to cross the street, and, if in the immediate surroundings, vehicle movement or imminent danger is sensed, an electrical impulse is transmitted to the computer system to stop and/or shut-down all vehicle(s) receiving the electrical impulses and/or all involved vehicle(s), and/or take control of the threatening vehicle(s).

Another object of the present invention is to employ intelligent video monitoring and video analysis to enable vehicles to recognize other vehicles so as to provide safety and vehicle control, regulated and prioritized traffic, and reduced vehicle emissions.

Another object of the present invention is to employ intelligent video monitoring and video analysis to enable vehicles to recognize pedestrians so as to provide safety and vehicle control, regulated and prioritized traffic, and reduced vehicle emissions.

Another object of the present invention is to employ intelligent video monitoring and video analysis to enable vehicles to recognize traffic control lights so as to provide safety and vehicle control, regulated and prioritized traffic, and reduced vehicle emissions.

Another object of the present invention is to employ intelligent video monitoring and video analysis to enable traffic control light mechanisms to recognize vehicles and pedestrians, so as to provide safety and vehicle control, regulated and prioritized traffic, and reduced vehicle emissions.

DESCRIPTION

Figure 1:
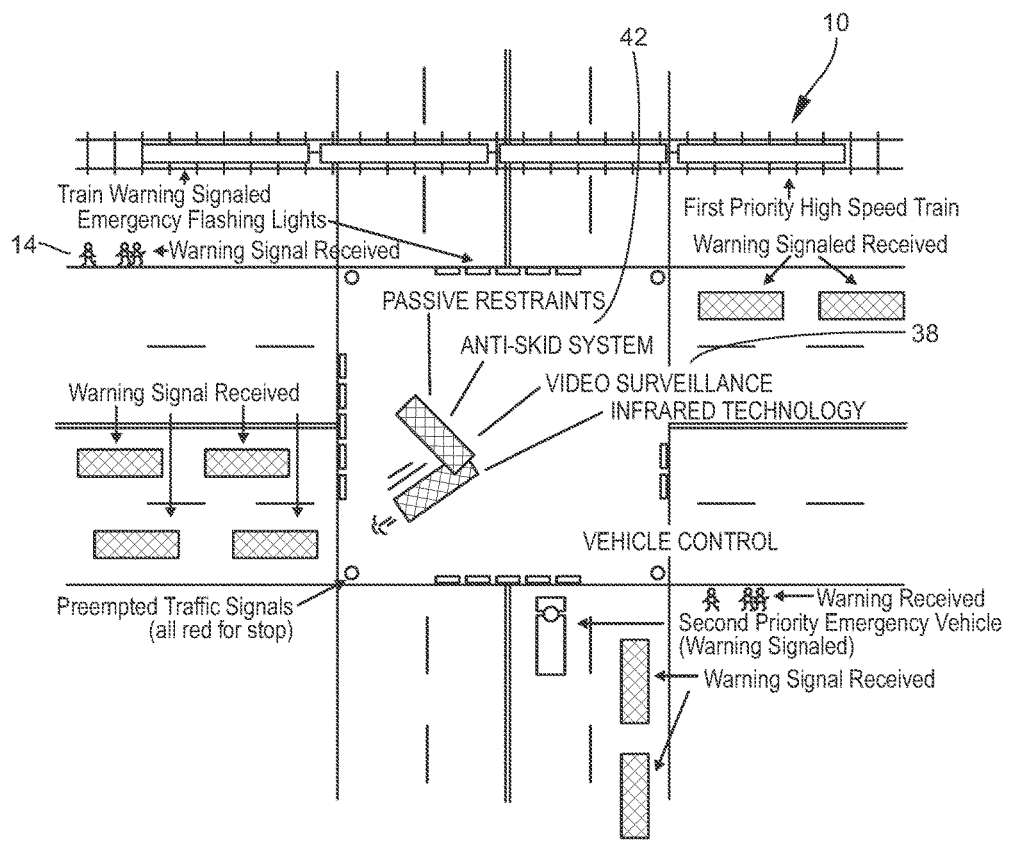
FIG. 1 is a diagrammatic view showing features that the present self-driving vehicles safety system can process and take into account.

The present self-driving vehicles safety system 10 includes synthesized and coordinated entities, each functionally distinct, working in combination to provide safety and vehicle control, regulated and prioritized traffic, and reduced vehicle emissions. The system 10 includes components, wherein the components include vehicles 12, pedestrians 14, traffic control light mechanisms 16 comprising red, yellow and green traffic lights.

The system 10 includes entities, wherein the entities comprise radar and sensor-based systems 18, GPS 20, cell phone technologies 22, Bluetooth and Java algorithm and programming systems 24, computer-based decision support algorithm systems 26, computer vision algorithm systems 28 that analyze camera images and extract information, and intelligent video monitoring and video analysis systems 30.

The system 10 includes processors 32 that communicate with all self-driving vehicles safety system components and entities. The system 10 communicates with vehicles 12, wherein the vehicles 12 have identification numbers, wherein the self-driving vehicles safety system 10 receives and processes the identification numbers, thereby providing safety and vehicle control, regulating and prioritizing traffic, and reducing vehicle emissions.

The system 10 is in communication with automated vehicle counts and emissions detection and mitigation mechanisms 30, thereby providing safety and vehicle control, regulating and prioritizing traffic, and reducing vehicle emissions.

The system 10 includes a transmitter 32 in communication with at least one component of the self-driving vehicles safety system 10, thereby providing safety and vehicle control, regulating and prioritizing traffic, and reducing vehicle emissions.

The system 10 includes a receiver 34 in communication with at least one component of the self-driving vehicles safety system 10, thereby providing safety and vehicle control, regulating and prioritizing traffic, and reducing vehicle emissions.

The system 10 communicates with the vehicles, wherein sensing performed by vehicles is a demanding imperative, wherein vehicles recognize other vehicles when responding to imminent danger, wherein sensors, transponders, transducers, and other actuators transmit radio signals to their respective actuator, each electronically converting radio signals into electromagnetic energy, deploying prioritized, corresponding responses, wherein each vehicle will stop and/or shut-down all vehicles receiving the electrical impulse and/or all involved vehicles.

The system 10 communicates with pedestrians 14, wherein pedestrian safety is paramount, wherein vehicles 12 recognize pedestrians 14 when responding to imminent danger or an imminent crash, wherein sensors, transponders, transducers, and other actuators of the self-driving safety system transmit and receive radio signals, each electronically converting radio signals into electromagnetic energy, deploying prioritized, corresponding responses, wherein each vehicle 12 will stop and/or shut-down all vehicles 12 receiving the electromagnetic energy.

The system 10 communicates with vehicles 12 and traffic control light mechanisms 16 that include red, yellow, and green lights, wherein the self-driving vehicles safety system 10 controls the red lights of the traffic control light mechanism 16 when an individual's life is in danger or a crash is imminent, wherein sensors, transponders, transducers, and other actuators of the self-driving vehicles safety system 10 transmit and receive radio signals, each electronically converting its radio signals into electromagnetic energy, deploying prioritized, corresponding responses, wherein each vehicle will stop and/or shut-down all vehicle(s) receiving the electromagnetic energy.

The system 10 communicates with radar and sensor-based systems 18 to receive real-time data from transducers, sensors, and other data sources that monitor a physical process, wherein the self-driving vehicles safety system 10 compares such data to predetermined standards and generates a signal to deploy a corresponding response, thereby preempting a traffic light, and thereby providing safety and vehicle control, regulating and prioritizing traffic, and reducing vehicle emissions.

The system 10 communicates with Bluetooth and Java algorithms 24, thereby providing safety and vehicle control, regulated and prioritized traffic, and reduced vehicle emissions.

The system 10 communicates with automatic vehicle counts and emissions detection and mitigation systems 30, wherein the self-driving vehicles safety system 10 processes information on the relationships between a number of vehicles 12 and a level of emissions for a given location and time period, thereby preempting a traffic control light to regulate a flow of vehicles.

The self-driving vehicles safety system 10 operates in response to information received from at least one component of the self-driving vehicles safety system 10, wherein the self-driving vehicles safety system 10 can override an operation of at least one component of the self-driving vehicles safety system in providing safety and vehicle control, regulating and prioritizing traffic, and reducing vehicle emissions.

The self-driving vehicles safety system 10 communicates with a public-address speaker 36, thereby furthering safety and vehicle control, regulating and prioritizing traffic, and reducing vehicle emissions.

The self-driving vehicles safety system 10 is in communication with a video surveillance mechanism 38, wherein infrared technology sends out short audio signals by invisible infrared light beams from permanently installed transmitters to self-driving vehicles safety system receivers 34 that decode the signals, wherein such video surveillance mechanism 38 can zoom in on a particular location when video surveillance is needed.

The self-driving vehicles safety system 10 communicates with continuous-wave radar 50, wherein continuous-wave radar 50, which is a more effective choice between radar and lidar when visibility is limited, exploits a Doppler principle, thereby anticipating a crash when an obstacle or hazard is within 30 feet, thereby deploying air-cushion-type passive restraints, thereby deploying an anti-skid system 42.

The self-driving vehicles safety system 10 can sense an obstacle or hazard within 500 feet to govern automatic braking and headway control, wherein the source of a carrier power is a solid-state oscillator 44 that produces high output power to generate microwave frequencies and frequencies higher than microwave frequencies.

The self-driving vehicles safety system 10 communicates with pedestrians 14 and employs ultrasound imaging for detection, identification and location of pedestrians 14.

The self-driving vehicles safety system 10 includes computer-based decision support algorithms 26, wherein voice, video, and data transmissions from monitoring sensors are fed into the computer-based decision support algorithms, thereby analyzing received transmissions from all sources to issue real time alerts when exceptions occur.

The self-driving vehicles safety system 10 includes a computer vision algorithm system 28 to extract information and analyze camera images to detect and recognize objects and detect motion to issue real time alerts when exceptions occur.

The self-driving vehicles safety system 10 includes intelligent video monitoring and video analysis system 46 to identify objects, analyze motion and extract video intelligence to issue real time alerts when exceptions occur.

The self-driving vehicles safety system 10 employs laser light pulses to scan the surroundings, wherein an inner processor saves each reflection point of a laser and generates a plan for a vehicle's behavior in order to avoid collisions with objects, wherein priority algorithms apply when vehicles 12 with similar priority classifications enter an intersection at the same time.

The self-driving vehicles safety system 10 employs Doppler lidar 48. The self-driving vehicles safety system 10 anticipates and averts harm to self-driving vehicles 12 around, over and under the self-driving vehicles 12, wherein by employing Doppler radar 50 the self-driving vehicles safety system 10 anticipates and averts harm to self-driving vehicles around, over and under the self-driving vehicles, wherein the self-driving vehicles safety system overlaps the Doppler lidar 48 and Doppler radar 50 when visibility changes from not limited to limited, where an interchange between Doppler lidar 48 and Doppler radar 50 is automatic and continuous when the vehicle 12 is in operation.

Continuous-wave radar can be used to illuminate and detect vehicles by techniques employing semiconductor tracer-diode surveillance utilizing one or two carrier frequencies and looking for reflections of the third harmonic, according to the McGraw-Hill Encyclopedia of Science & Technology.

FIG. 1 shows that the system 10 may process information relating to trains, emergency flashing lights, pedestrians, passive restraints, anti-skid systems, video surveillance, infrared technology, vehicle control, emergency vehicles, and preempted traffic signals. To process information includes the features of taking in information, processing the information according to certain guidelines, and then issuing outputs.

Figure 2:
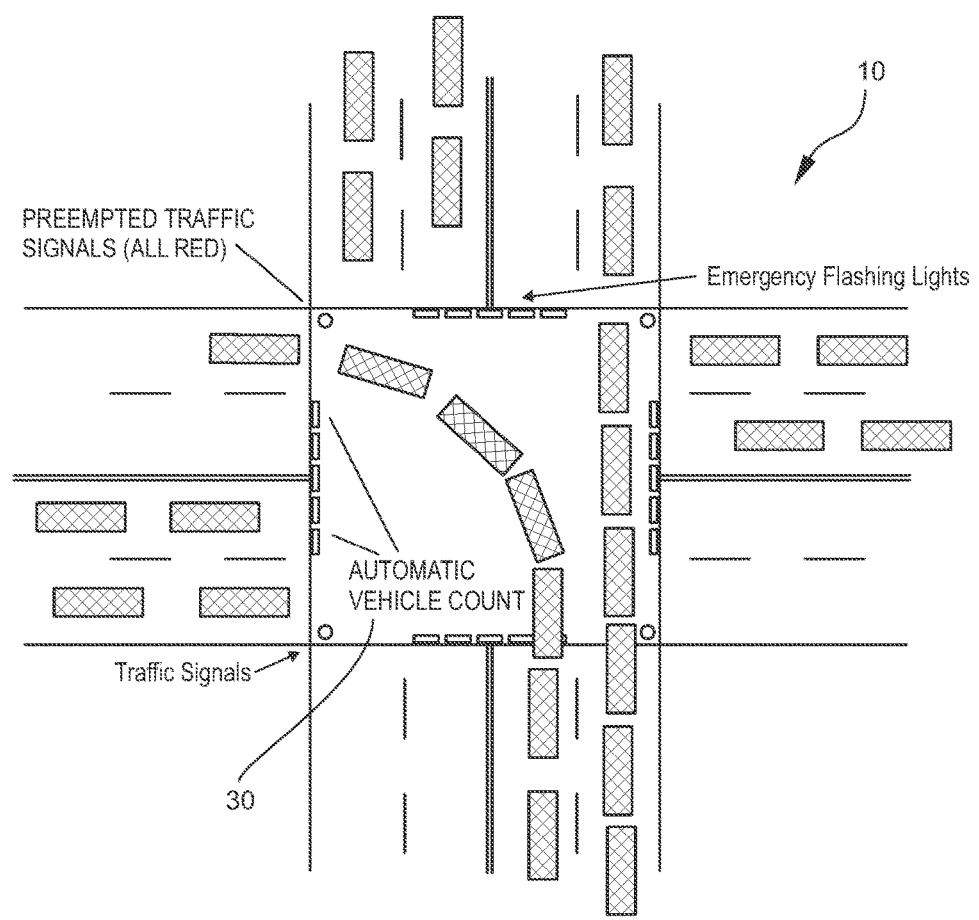
FIG. 2 is a diagrammatic view showing features that the present self-driving vehicles safety system can process and take into account.

FIG. 2 shows that the system 10 may process information relating to preempted traffic signals, emergency flashing lights, automatic vehicle counts and traffic signals.

Figure 3:
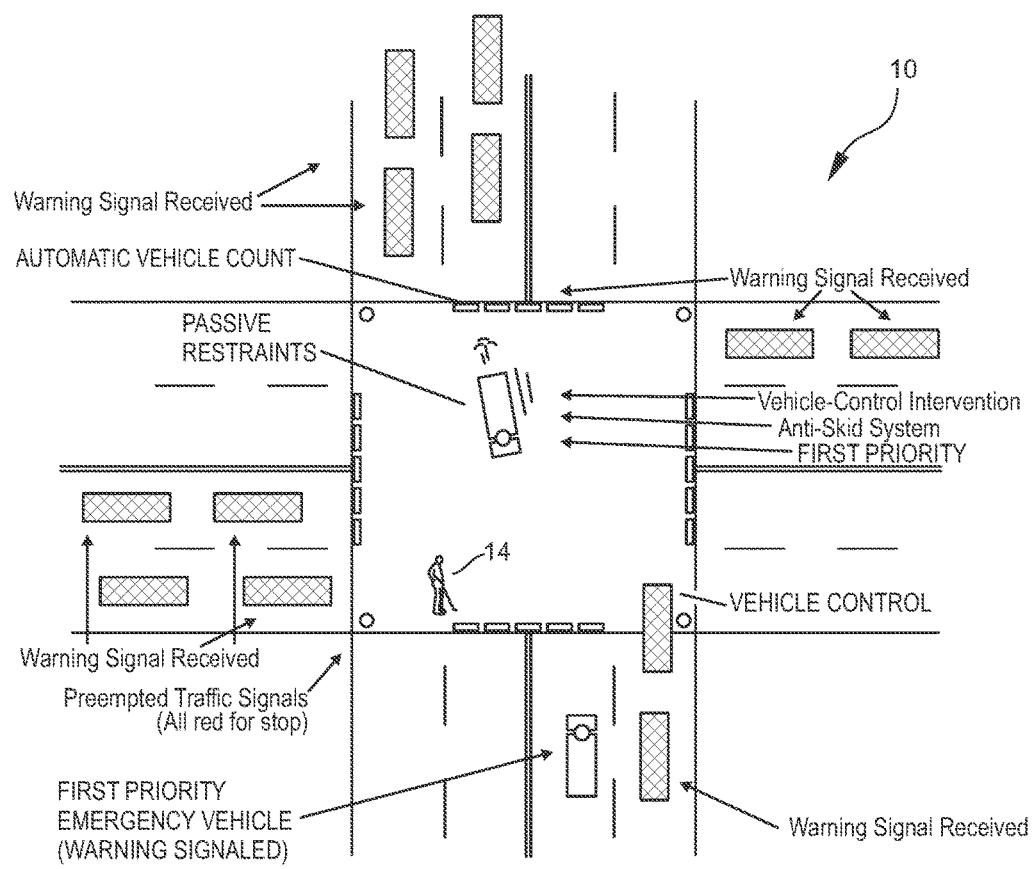
FIG. 3 is a diagrammatic view showing features that the present self-driving vehicles safety system can process and take into account.

FIG. 3 shows that the system 10 may process information relating to warning signals, automatic vehicle counts, passive restraints, vehicle control intervention, anti-skid systems, first priorities, preempted traffic signals, emergency vehicles, and pedestrians.

Figure 4:
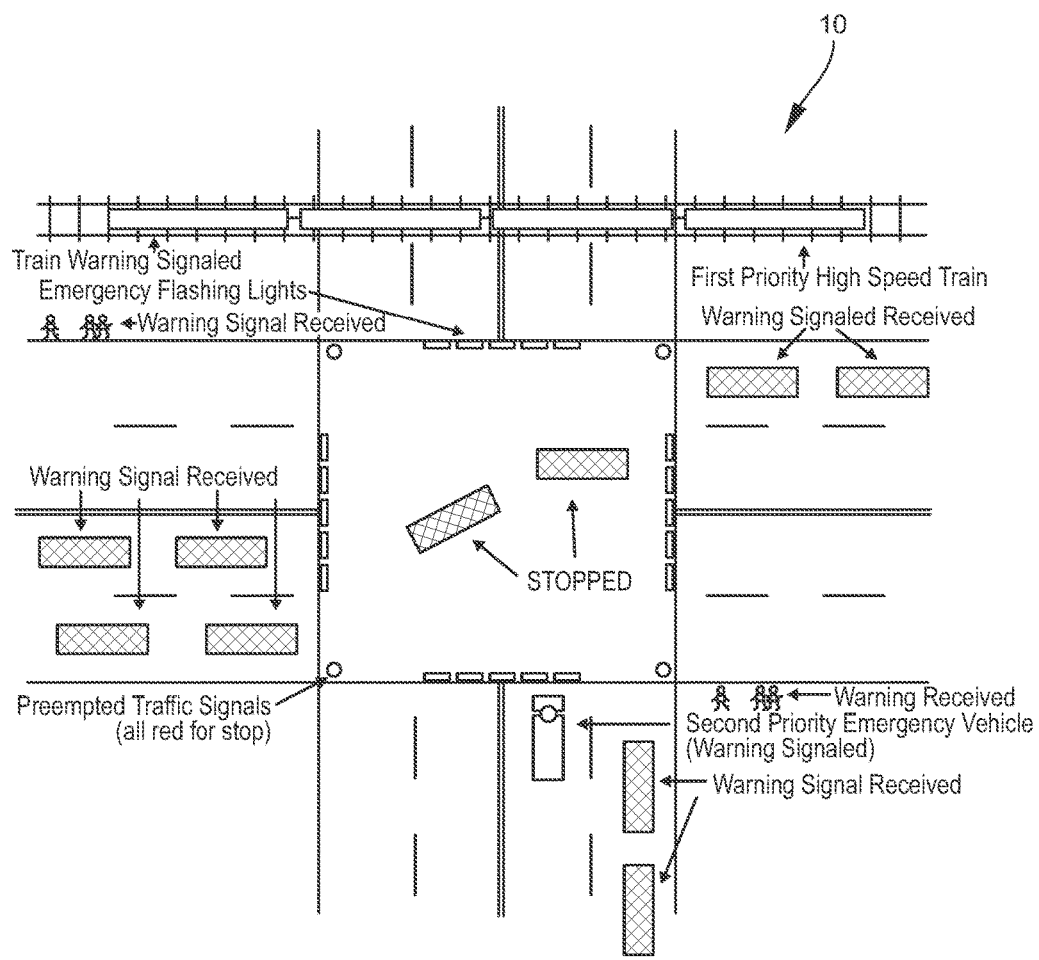
FIG. 4 is a diagrammatic view showing features that the present self-driving vehicles safety system can process and take into account.

FIG. 4 shows that the system 10 may process information relating to train warnings, emergency flashing lights, high speed trains, preempted traffic signals, emergency vehicles, and pedestrians.

Figure 5:
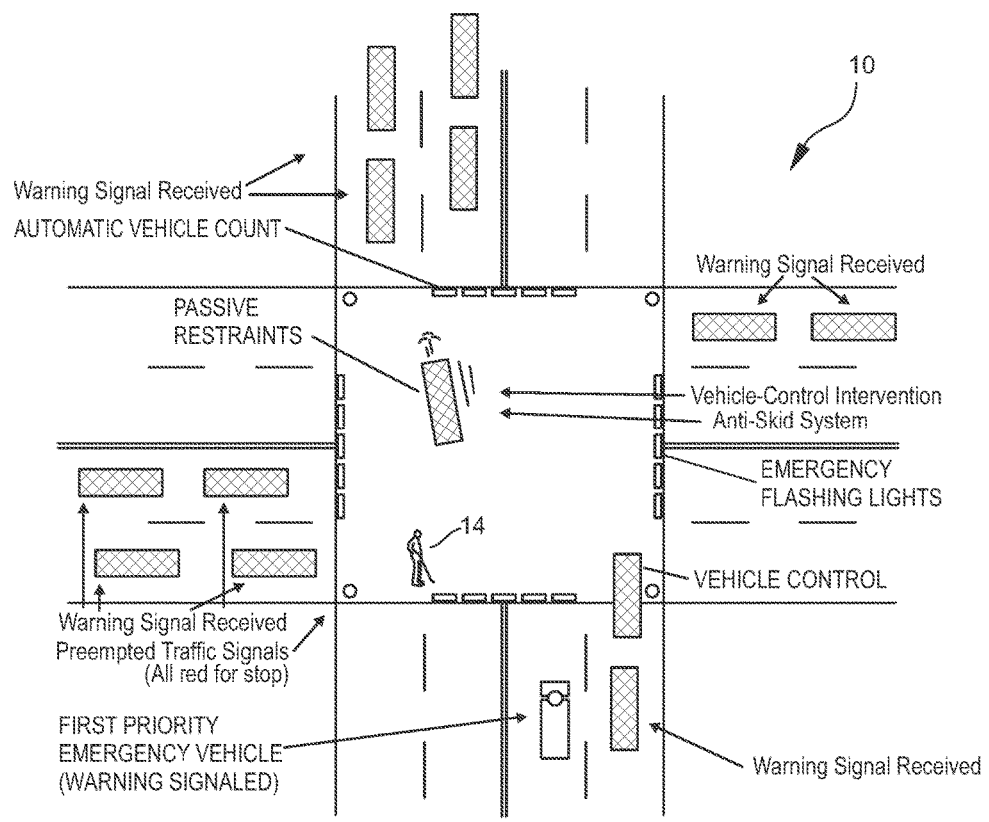
FIG. 5 is a diagrammatic view showing features that the present self-driving vehicles safety system can process and take into account.

FIG. 5 shows that the system 10 may process information relating to continuous wave Doppler radar, automatic braking and headway control, warning signals, automatic vehicle counts, passive restraints, vehicle control intervention, anti-skid systems, emergency flashing lights, preempted traffic signals, emergency vehicles, vehicle control, and pedestrians.

Figure 6:
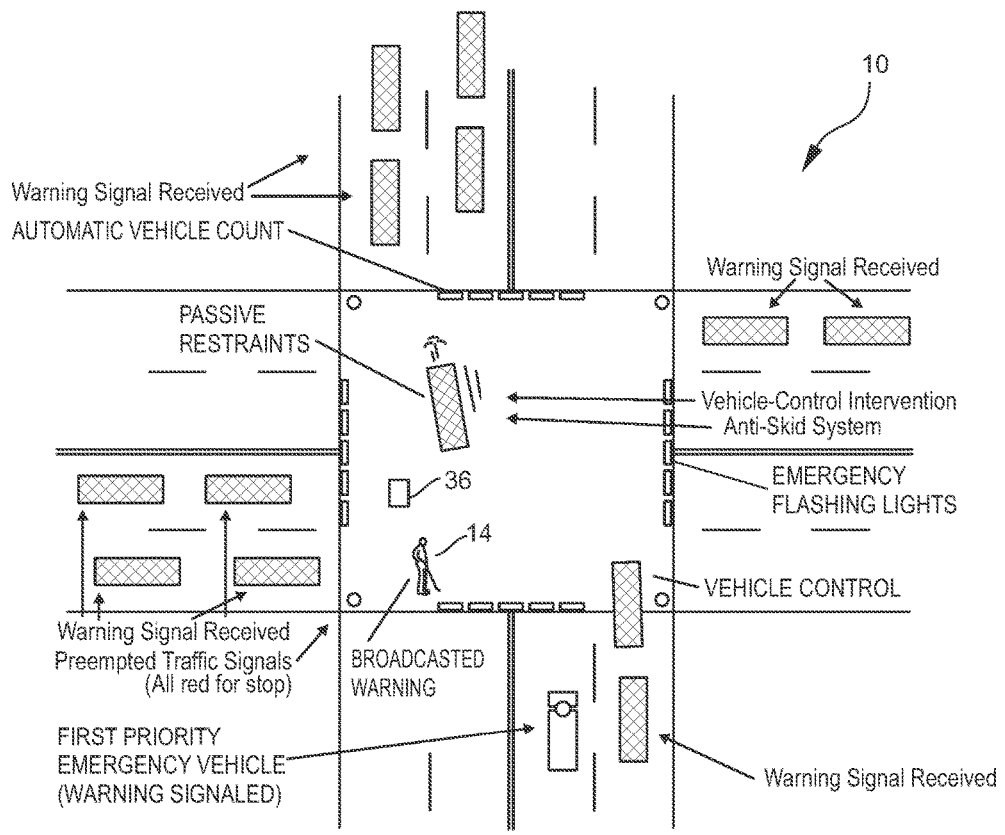
FIG. 6 is a diagrammatic view showing features that the present self-driving vehicles safety system can process and take into account.

FIG. 6 shows that the system 10 may process information relating to lidar, warning signals, automatic vehicle counts, passive restraints, vehicle control intervention, anti-skid systems, emergency flashing lights, vehicle control, preempted traffic signals, public address systems and broadcast warnings, and emergency vehicles.

Figure 7:
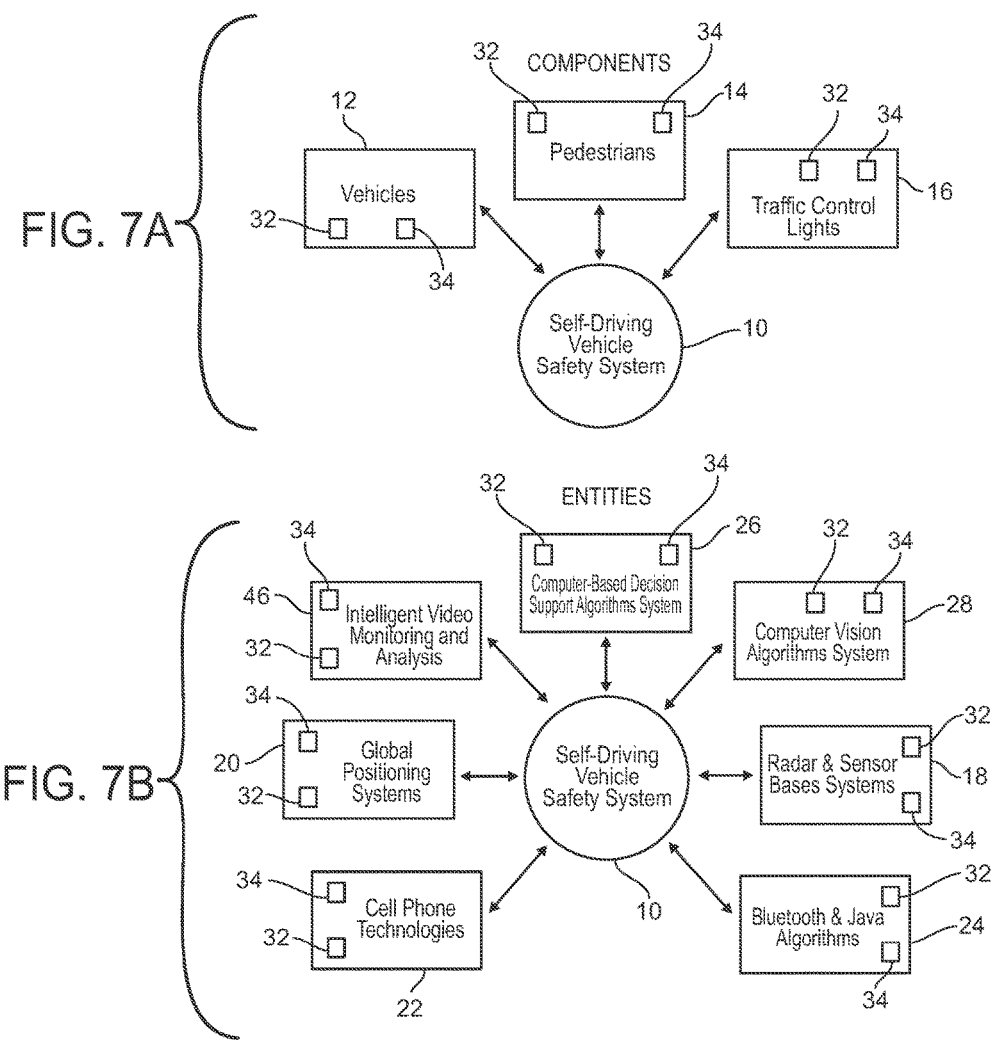
FIG. 7A is a diagrammatic view showing components of the present self-driving vehicles safety system.
FIG. 7B is a diagrammatic view showing entities of the present self-driving vehicles safety system.

FIG. 7A shows that the system 10 may process information with vehicles 12, pedestrians 14, and traffic control lights 16.

FIG. 7B shows that the system 10 may process information from cell phone technologies 22, global positioning systems 20, intelligent video monitoring and analysis 46, computer based decision support algorithms 26, computer vision algorithms system 28, radar and sensor based systems 18, and Bluetooth and Java algorithms 24.

Figure 8:
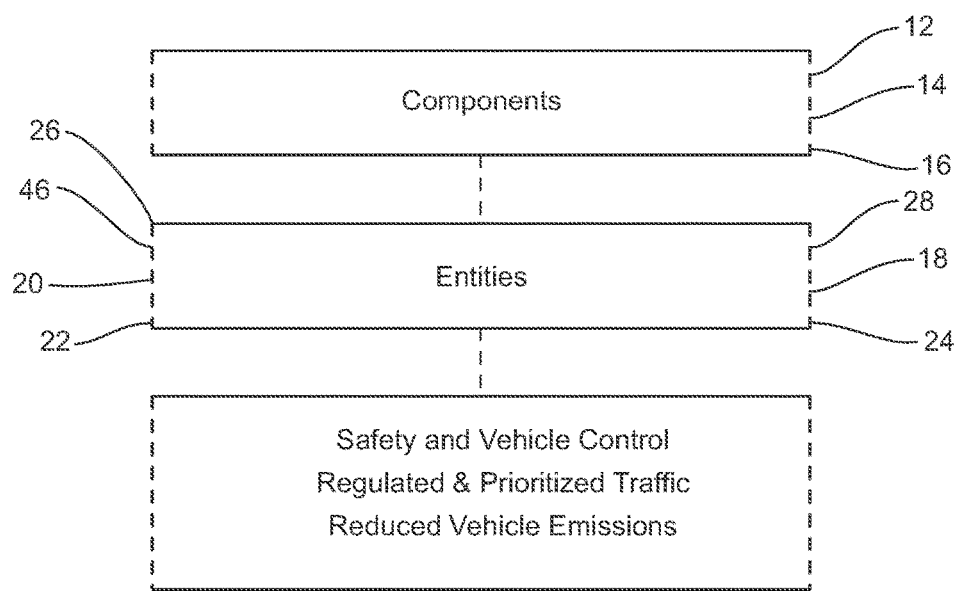
FIG. 8 is a diagrammatic view showing features that the present self-driving vehicles safety system can process and take into account.

FIG. 8 shows that that the system 10 may improve safety and vehicle control, may regulate and prioritize traffic, and may reduce vehicle emissions.

Figure 9:
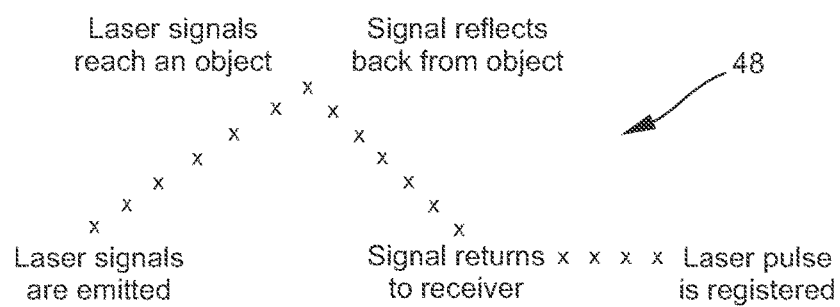
FIG. 9 is a diagrammatic view showing a self-driving lidar laser algorithm safety system.

FIG. 9 shows a lidar laser algorithm of the system 10.

Figure 10:
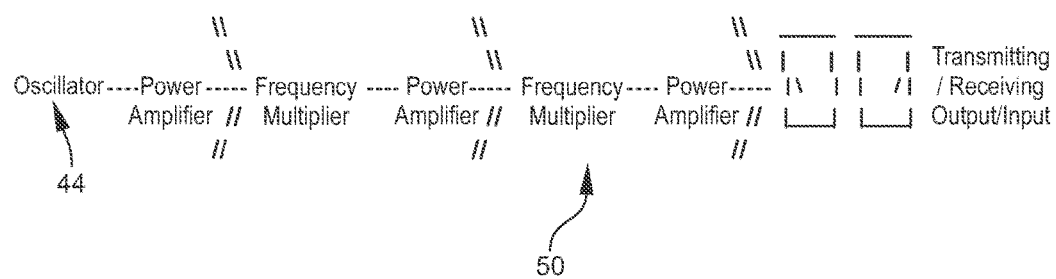
FIG. 10 is a diagrammatic view showing a self-driving continuous-wave Doppler radar safety system.

FIG. 10 shows a continuous wave Doppler radar of the system 10.

Figure 11:
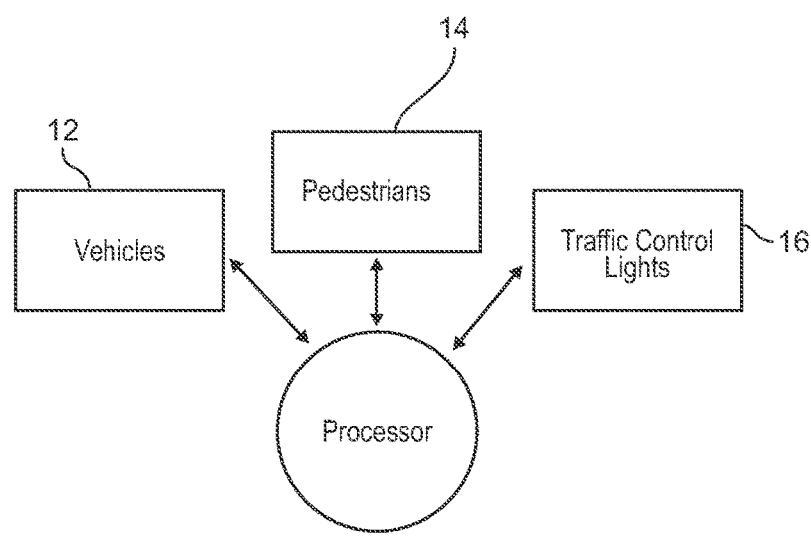
FIG. 11 is a diagrammatic view showing self-driving vehicle safety system components.

FIG. 11 shows that a processor may send and receive information to and from vehicles 12, pedestrians 14, and traffic control lights 16.

Figure 12:
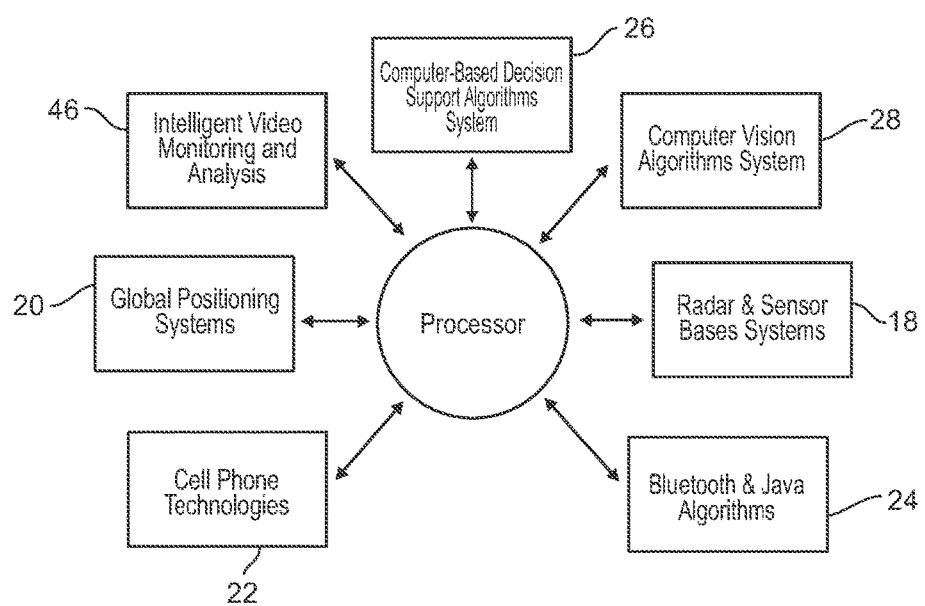
FIG. 12 is a diagrammatic view showing self-driving vehicle safety system entities.

FIG. 12 shows that a processor may send and received information to and from cell phone technologies 22, global positioning systems 20, intelligent video monitoring and analysis 46, computer based decision support algorithms 26, computer vision algorithms system 28, radar and sensor based systems 18, and Bluetooth and Java algorithms 24.

Figure 13:
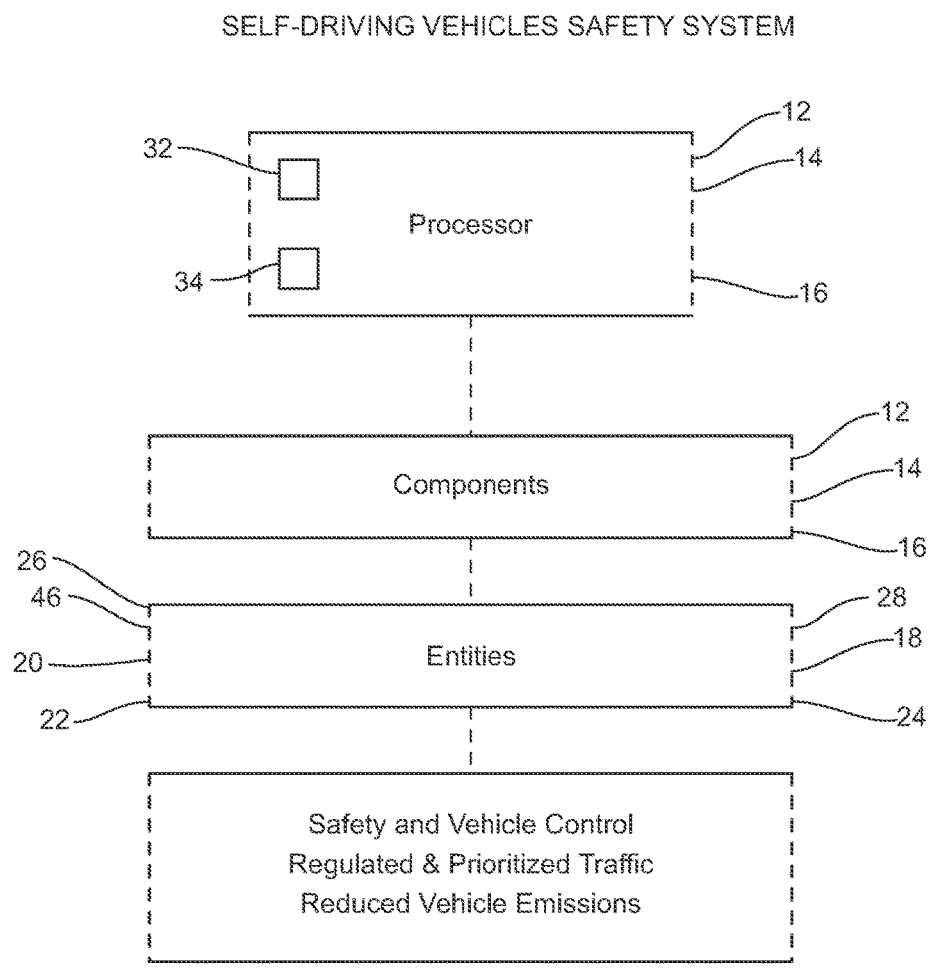
FIG. 13 is a diagrammatic view showing a self-driving vehicles safety system.

FIG. 13 shows that that a processor of the system 10 may improve safety and vehicle control, may regulate and prioritize traffic, and may reduce vehicle emissions.

Figure 14:
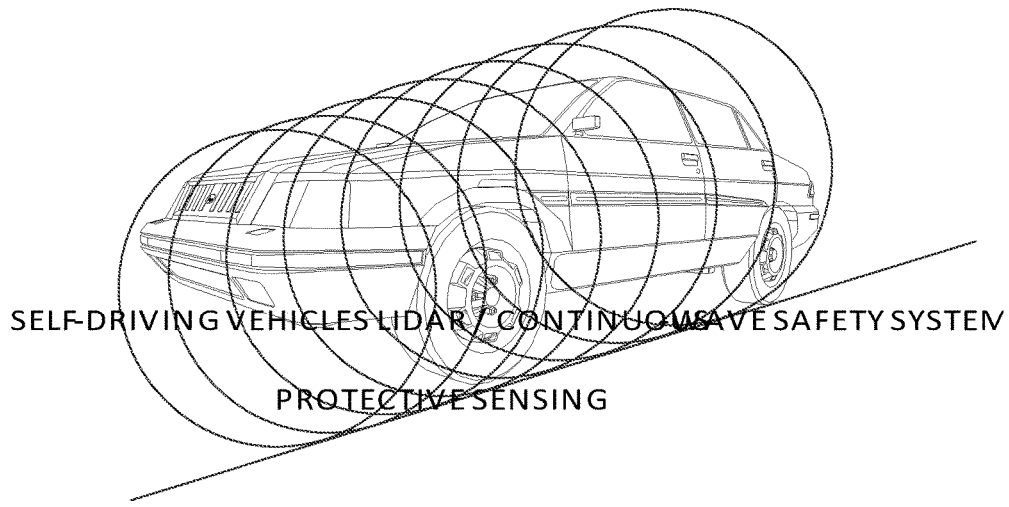
FIG. 14 shows a self-driving lidar safety system.

FIG. 14 diagrammatically shows a self-driving lidar safety system.

The self-driving vehicles safety system 10 includes synthesized and coordinated entities 18, 20, 22, 24, 26, 28, 46 that are functionally distinct from each other and that work in combination. The self-driving vehicles safety system 10 includes a lidar system 48, a continuous-wave radar system 50, a computer vision system 28, and an intelligent video monitoring and video analysis system 46. The self-driving vehicles safety system 10 includes components that include vehicle components 12, pedestrian components 14, traffic control light components 16 having traffic control light mechanism components and traffic complex components. The self-driving vehicles safety system 10 includes entities that include other radar and sensor-based system entities 18, GPS entities 20, and cell phone technology entities 22. The lidar system 48 includes:

a) a system portion that enables vehicles 12 to recognize other vehicles 12, that determines whether an individual's life is threatened or a crash is imminent, that transmits electrical impulses to stop or shut-down all vehicles 12 receiving the electrical impulses or all involved vehicles 12 or that takes control of threatening vehicles 12;

b) a system portion that enables vehicles 12 to recognize pedestrians 14, that determines whether an individual's life is threatened or a crash is imminent, that transmits electrical impulses to stop or shut-down all vehicles 12 receiving the electrical impulses or all involved vehicles 12 or that takes control of threatening vehicles;

c) a system portion that enables vehicles 12 to recognize traffic control lights 16;

d) a system portion that enables traffic control light mechanisms to recognize other vehicles 12, that determines whether an individual's life is threatened or a crash is imminent, that transmits electrical impulses to stop or shut-down all vehicles 12 receiving the electrical impulses or all involved vehicles 12 or that takes control of threatening vehicles 12;

e) a system portion that enables traffic control light mechanisms to employ artificial intelligence, rendering instantaneous, protective action when undefined, unplanned danger is detected;

f) a self-driving vehicles safety system processor;

g) a self-driving vehicles safety system transmitter in communication with at least one component 12, 14, 16 of the traffic complex;

h) a self-driving vehicles safety system receiver in communication with at least one component 12, 14, 16 of the traffic complex;

i) a system portion that operates in response to information received from at least one component 12, 14, 16 of the traffic complex and that can override an operation of at least one component 12, 14, 16 of the traffic complex;

j) a system portion that generates laser light pulses that move outwards in various directions until the laser light pulses reach an object and then reflect and return to the receiver, and that includes an inner processor that saves each reflection point of a laser to generate a 3D image of any physical object;

k) a system portion that detects a presence, direction, distance, and speed of a vehicle 12 by sending out laser pulses of high-frequency waves that are reflected off the vehicle 12;

l) a system portion that monitors prioritized vehicles 12, that compares alert signals received and priority algorithms with predetermined standards, and that gives a go-ahead to prioritized vehicles 12 accordingly;

m) a system portion that scans an environment and that predicts a vehicle's behavior in order to avoid collisions with obstacles;
n) a system portion that exploits the Doppler principle to render the lidar system 48 immune to interference from large stationary objects and slow-moving clutter;
o) a system portion that anticipates a crash when an obstacle or hazard is within 30 feet, that deploys air-cushion-type passive restraints, and that deploys an anti-skid system 42;
p) a system portion that senses an obstacle or hazard within 500 feet and that governs automatic braking and headway control;
q) a system portion that employs a carrier power of an X-band Gunn-type solid-state oscillator that generates microwave frequencies and above;
r) a system portion that detects when visibility is limited or not limited and selects lidar 48 instead of radar 50 when visibility is not limited;
s) a system portion that selects radar 50 instead of lidar 48 when visibility is limited;
t) a system portion that includes a lidar generated plan that moves a vehicle as far to the right side of the roadway as is safe to allow a priority vehicle to pass;
u) a system portion that employs lidar 48, when visibility is not limited, that anticipates and averts harm to vehicles, harm around vehicles, and harm over and under vehicles, and that averts collisions;
v) a system portion that employs radar 50, when visibility is limited, that anticipates and averts harm to vehicles 12, harm around vehicles 12, harm over and under vehicles 12, and that averts collisions;
w) a system portion that automatically employs both lidar 48 and radar 50 while visibility changes from not limited to limited; and
x) a system portion that automatically employs both lidar 48 and radar 50 while visibility changes from limited to not limited.
y) a system portion that enables an interchange between lidar 48 and continuous-wave radar 50, depending on visibility, that is automatic and continuous in an averting of harm to self-driving vehicles 12, and that averts collisions;
z) a system portion responsive to electronic tags to vehicles and roadside objects, that collects target mass information to allow reliable pre-collision restraint deployment decisions;
aa) a system portion that employs coordinated components 12, 14, 16, and entities 18, 20, 22, 24, 26, 28, 46, that observes prioritized vehicle codes, that automatically provides information on optimum routing, closed and obstructed roadways and railroad crossings, that preempts traffic control lights, and that warns pedestrians 14 of advancing prioritized vehicles 12;
bb) a system portion that recognizes traffic signals and advises when it is safe for an individual to cross the street, that senses vehicle movement or imminent danger in immediate surroundings of the individual, and that transmits an electrical impulse to a computer system to stop or shut-down all vehicles 12 receiving the electrical impulse or all involved vehicles 12 or take control of threatening vehicles 12; and
cc) a system portion that reads, understands, and obeys roadway lines, markings, symbols and signs, that reads, understands and obeys lines, markings, symbols and signs near, under and over the roadways, that reads, understands and obeys traffic control lights 16, and that employs lidar 48 and continuous-wave radar 50 interchangeably as lighting conditions fluctuate for continuous visibility.

The self-driving vehicles safety system 10 of the lidar system 48 further includes an automatic vehicle count and emissions detection and mitigation mechanism 30, wherein the self-driving vehicles safety system 10 includes:
a) a continuous-wave radar system portion that can be used to illuminate and detect vehicles by techniques employing semiconductor tracer-diode surveillance utilizing one or two carrier frequencies and looking for reflections of the third harmonic;
b) a vehicle count and emissions detection mechanism system portion that processes information on a number of vehicles and levels of emissions for a given location and time period to determine if dynamic traffic assignment will be executed to preempt traffic control lights 16 to regulate the flow of vehicles 12;
c) a mitigating vehicle emissions system portion that automatically adjusts stop light timing to speed up or reroute vehicle movement and that uses in-vehicle displays and in-vehicle interactive voice communications to relieve congestion;
d) a traffic control light mechanism system portion that determines if dynamic traffic assignment is to be executed and that executes predetermined rerouting instructions, based on real or predicted traffic conditions, as measured by automatic vehicle counts; and
e) an automatic, dynamic vehicle count system portion having an infrastructure emissions sensor system portion that senses, identifies and classifies types and levels of emissions in each vehicle 12 to provide safety and vehicle control, to regulate and prioritize traffic, and to reduce vehicle emissions.

The self-driving vehicles safety system 10 includes synthesized and coordinated entities 18, 20, 22, 24, 26, 28, 46 that are functionally distinct from each other and that work in combination. The self-driving vehicles safety system 10 includes a lidar system 48, a continuous-wave radar system 50, a computer vision system 28, and an intelligent video monitoring and video analysis system 46. The self-driving vehicles safety system 10 includes components that include vehicle components 12, pedestrian components 14, traffic control light components 16 having traffic control light mechanism components, and traffic complex components. The self-driving vehicles safety system 10 includes entities that include other radar and sensor-based system entities 18, GPS entities 20, and cell phone technology entities 22. The continuous-wave radar system 50 includes:
a) a system portion that enables vehicles 12 to recognize other vehicles, that determines whether an individual's life is threatened or a crash is imminent, that transmits electrical impulses to stop or shut-down all vehicles receiving the electrical impulses or all involved vehicles 12 or that takes control of threatening vehicles 12;
b) a system portion that enables vehicles 12 to recognize pedestrians 14, that determines whether an individual's life is threatened or a crash is imminent, that transmits electrical impulses to stop or shut-down all vehicles 12 receiving the electrical impulses or all involved vehicles 12 or that takes control of threatening vehicles 12;
c) a system portion that enables vehicles 12 to recognize traffic control lights 16;
d) a system portion that enables traffic control light mechanisms to recognize other vehicles 12, that determines whether an individual's life is threatened or a crash is imminent, that transmits electrical impulses to stop or shut-down all vehicles 12 receiving the electrical impulses or all involved vehicles 12 or that takes control of threatening vehicles 12;

e) a system portion that enables traffic control light mechanisms to employ artificial intelligence, rendering instantaneous, protective action when undefined, unplanned danger is detected;

f) a self-driving vehicles safety system processor;

g) a self-driving vehicles safety system transmitter in communication with at least one component 12, 14, 16 of the traffic complex;

h) a self-driving vehicles safety system receiver in communication with at least one component 12, 14, 16 of the traffic complex;

i) a system portion that operates in response to information received from at least one component 12, 14, 16 of the traffic complex and that can override an operation of at least one component 12, 14, 16 of the traffic complex;

j) a system portion that detects a presence, direction, distance, and speed of a vehicle 12 by sending out high-frequency waves that are reflected off the vehicle 12;

k) a system portion that monitors prioritized vehicles 12, that compares alert signals received and priority algorithms with predetermined standards, and that gives a go-ahead to prioritized vehicles 12 accordingly;

l) a system portion that scans an environment and that predicts a vehicle's behavior in order to avoid collisions with obstacles;

m) a system portion that exploits the Doppler principle to render the continuous-wave radar system immune to interference from large stationary objects and slow-moving clutter;

n) a system portion that anticipates a crash when an obstacle or hazard is within 30 feet, that deploys air-cushion-type passive restraints, and that deploys an anti-skid system;

o) a system portion that senses an obstacle or hazard within 500 feet and that governs automatic braking and headway control;

p) a system portion that employs a carrier power of an X-band Gunn-type solid-state oscillator that generates microwave frequencies and above;

q) a system portion that detects when visibility is limited or not limited and selects lidar 48 instead of radar 50 when visibility is not limited;

r) a system portion that selects radar 50 instead of lidar 48 when visibility is limited;

s) a system portion that includes a lidar generated plan that moves a vehicle 12 as far to the right side of the roadway as is safe to allow a priority vehicle 12 to pass;

t) a system portion that employs lidar 48, when visibility is not limited, that anticipates and averts harm to vehicles 12, harm around vehicles 12, and harm over and under vehicles 12, and that averts collisions;

u) a system portion that employs radar, when visibility is limited, that anticipates and averts harm to vehicles 12, harm around vehicles 12, harm over and under vehicles 12, and that averts collisions;

v) a system portion that automatically employs both lidar 48 and radar 50 while visibility changes from not limited to limited; and x) a system portion that automatically employs both lidar 48 and radar 50 while visibility changes from limited to not limited.

y) a system portion that enables an interchange between lidar 48 and continuous-wave radar 50, depending on visibility, that is automatic and continuous in an averting of harm to self-driving vehicles, and that averts collisions;

z) a system portion responsive to electronic tags to vehicles 12 and roadside objects, that collects target mass information to allow reliable pre-collision restraint deployment decisions;

aa) a system portion that employs coordinated components 12, 14, 16 and entities 18, 20, 22, 24, 26, 28, 46, that observes prioritized vehicle codes, that automatically provides information on optimum routing, closed and obstructed roadways and railroad crossings, that preempts traffic control lights 16, and that warns pedestrians 14 of advancing prioritized vehicles 12;

bb) a system portion that recognizes traffic signals and advises when it is safe for an individual to cross the street, that senses vehicle movement or imminent danger in immediate surroundings of the individual, and that transmits an electrical impulse to a computer system to stop or shut-down all vehicles 12 receiving the electrical impulse or all involved vehicles 12 or take control of threatening vehicles 12; and cc) a system portion that reads, understands, and obeys roadway lines, markings, symbols and signs, that reads, understands and obeys lines, markings, symbols and signs near, under and over the roadways, that reads, understands and obeys traffic control lights 16, and that employs lidar 48 and continuous-wave radar 50 interchangeably as lighting conditions fluctuate for continuous visibility.

The self-driving vehicles safety system 10 further includes an automatic vehicle count and emissions detection and mitigation mechanism 30, wherein the self-driving vehicles safety system 10 of the continuous-wave radar system 50 includes:

a) a continuous-wave radar system portion that can be used to illuminate and detect vehicles 12 by techniques employing semiconductor tracer-diode surveillance utilizing one or two carrier frequencies and looking for reflections of the third harmonic;

b) a vehicle count and emissions detection mechanism system portion that processes information on a number of vehicles and levels of emissions for a given location and time period to determine if dynamic traffic assignment will be executed to preempt traffic control lights to regulate the flow of vehicles;

c) a mitigating vehicle emissions system portion that automatically adjusts stop light timing to speed up or reroute vehicle movement and that uses in-vehicle displays and in-vehicle interactive voice communications to relieve congestion;

d) a traffic control light mechanism system portion that determines if dynamic traffic assignment is to be executed and that executes predetermined rerouting instructions, based on real or predicted traffic conditions, as measured by automatic vehicle counts; and e) an automatic, dynamic vehicle count system portion and a infrastructure emissions sensor system portion that senses, identifies and classifies types and levels of emissions in each vehicle 12 to provide safety and vehicle control, to regulate and prioritize traffic, and to reduce vehicle emissions.

The self-driving vehicles safety system 10 includes synthesized and coordinated entities 18, 20, 22, 24, 26, 28, 46 that are functionally distinct from each other and that work in combination. The self-driving vehicles safety system 10 includes a lidar system 48, a continuous-wave radar system 50, a computer vision system 28, and an intelligent video monitoring and video analysis system 46 The self-driving vehicles safety system 10 includes components that include vehicle components 12, pedestrian components 14, traffic control light components 16 having traffic control light mechanism components and traffic complex components. The self-driving vehicles safety system 10 includes entities that include other radar and sensor-based system entities 18, GPS entities 20, and cell phone technology entities 22. The computer vision system 28 includes:

a) a system portion that is disposed in a vehicle 12 as an integral part of the vehicle 12 and that includes built-in or installable computer vision devices that provide high-level understanding of digital images and videos, that provides automatic extraction, analysis and understanding of useful information from a single image or a sequence of images, that develops a theoretical and algorithmic basis to achieve automatic visual understanding, and that incorporates intelligent video monitoring and video analysis to identify objects, analyze motion and extract video intelligence from data gathered by digital image processing systems, visually sensed video, and none visually sensed data employing motion detection video;

b) a system portion that enables vehicles 12 to recognize other vehicles 12, that determines whether an individual's life is threatened or a crash is imminent, that transmits electrical impulses to stop or shut-down all vehicles 12 receiving the electrical impulses or all involved vehicles 12 or that takes control of threatening vehicles 12;

c) a system portion that enables vehicles 12 to recognize pedestrians 14, that determines whether an individual's life is threatened or a crash is imminent, that transmits electrical impulses to stop or shut-down all vehicles 12 receiving the electrical impulses or all involved vehicles 12 or that takes control of threatening vehicles 12;

d) a system portion that enables vehicles 12 to recognize traffic control lights 16;

e) a system portion that enables traffic control light mechanisms to recognize other vehicles 12, that determines whether an individual's life is threatened or a crash is imminent, that transmits electrical impulses to stop or shut-down all vehicles 12 receiving the electrical impulses or all involved vehicles 12 or that takes control of threatening vehicles 12;

f) a system portion that enables traffic control light mechanisms to employ artificial intelligence, rendering instantaneous, protective action when undefined, unplanned danger is detected;

g) a self-driving vehicles safety system processor;

h) a self-driving vehicles safety system transmitter in communication with at least one component of the traffic complex;

i) a self-driving vehicles safety system receiver in communication with at least one component of the traffic complex;

j) a system portion that operates in response to information received from at least one component 12, 14, 16 of the traffic complex and that can override an operation of at least one component 12, 14, 16 of the traffic complex;

k) a system portion that detects a presence, direction, distance, and speed of a vehicle 12 by sending out high-frequency waves that are reflected off the vehicle 12;

l) a system portion that monitors prioritized vehicles 12, that compares alert signals received and priority algorithms with predetermined standards, and that gives a go-ahead to prioritized vehicles 12 accordingly;

m) a system portion that scans an environment and that predicts a vehicle's behavior in order to avoid collisions with obstacles;

n) a system portion responsive to electronic tags to vehicles 12 and roadside objects, that collects target mass information to allow reliable pre-collision restraint deployment decisions;

o) a system portion that employs coordinated components 12, 14, 16 and entities 18, 20, 22, 24, 26, 28, 46, that observes prioritized vehicle codes, that automatically provides information on optimum routing, closed and obstructed roadways and railroad crossings, that preempts traffic control lights 16, and that warns pedestrians 14 of advancing prioritized vehicles 12;

p) a system portion that recognizes traffic signals and advises when it is safe for an individual to cross the street, that senses vehicle movement or imminent danger in immediate surroundings of the individual, and that transmits an electrical impulse to a computer system to stop or shut-down down all vehicles 12 receiving the electrical impulse or all involved vehicles 12 or take control of threatening vehicles 12; and q) a system portion that reads, understands, and obeys roadway lines, markings, symbols and signs, that reads, understands and obeys lines, markings, symbols and signs near, under and over the roadways, that reads, understands and obeys traffic control lights, and that employs lidar 48 and continuous-wave radar 50 interchangeably as lighting conditions fluctuate for continuous visibility.

The self-driving vehicles safety system 10 further includes an automatic vehicle count and emissions detection and mitigation mechanism 30, wherein the self-driving vehicles safety system 10 of the computer vision system 28 includes:

a) a continuous-wave radar system portion that can be used to illuminate and detect vehicles by techniques employing semiconductor tracer-diode surveillance utilizing one or two carrier frequencies and looking for reflections of the third harmonic;

b) a vehicle count and emissions detection mechanism system portion that processes information on a number of vehicles 12 and levels of emissions for a given location and time period to determine if dynamic traffic assignment will be executed to preempt traffic control lights 16 to regulate the flow of vehicles 12;

c) a mitigating vehicle emissions system portion that automatically adjusts stop light timing to speed up or reroute vehicle movement and that uses in-vehicle displays and in-vehicle interactive voice communications to relieve congestion;

d) a traffic control light mechanism system portion that determines if dynamic traffic assignment is to be executed and that executes predetermined rerouting instructions, based on real or predicted traffic conditions, as measured by automatic vehicle counts; and e) an automatic, dynamic vehicle count system portion and an infrastructure emissions sensor system portion that senses, identifies and classifies types and levels of emissions in each vehicle 12 to provide safety and vehicle control, to regulate and prioritize traffic, and to reduce vehicle emissions.

The self-driving vehicles safety system 10 includes synthesized and coordinated entities 18, 20, 22, 24, 26, 28, 46 that are functionally distinct from each other and that work in combination. The self-driving vehicles safety system 10 includes a lidar system 48, a continuous-wave radar system 50, a computer vision system 28, and an intelligent video monitoring and video analysis system 46. The self-driving vehicles safety system 10 includes components that include vehicle components 12, pedestrian components 14, traffic control light components 16 having traffic control light mechanism components and traffic complex components. The self-driving vehicles safety system 10 includes entities that include other radar and sensor-based system entities 18, GPS entities 20, and cell phone technology entities 22, wherein the intelligent video monitoring and video analysis system 46 includes:

a) a system portion that is disposed in a vehicle 12 as an integral part of the vehicle 12 and that includes built-in or installable computer vision devices that provide high-level understanding of digital images and videos, that provides automatic extraction, analysis and understanding of useful information from a single image or a sequence of images, that develops a theoretical and algorithmic basis to achieve automatic visual understanding, and that incorporates intelligent video monitoring and video analysis to identify objects, analyze motion and extract video intelligence from data gathered by digital image processing systems, visually sensed video, and none visually sensed data employing motion detection video;

b) a system portion having intelligent video monitoring and video analysis that identifies objects, analyzes motion, extracts video intelligence, and issues real time alerts when exceptions occur;

c) a system portion having intelligent video and digital image processing that recognizes traffic signals and advises when it is safe for an individual to cross the street and, if in immediate surroundings vehicle movement or imminent danger is sensed, transmits an electrical impulse to at least one of 1) stop and shutdown guided movement and 2) take control of threatening vehicles 12;

d) a system portion that enables vehicles 12 to recognize other vehicles 12, that determines whether an individual's life is threatened or a crash is imminent, that transmits electrical impulses to stop or shut-down all vehicles 12 receiving the electrical impulses or all involved vehicles 12 or that takes control of threatening vehicles 12;

e) a system portion that enables vehicles 12 to recognize pedestrians 14, that determines whether an individual's life is threatened or a crash is imminent, that transmits electrical impulses to stop or shut-down all vehicles receiving the electrical impulses or all involved vehicles or that takes control of threatening vehicles;

f) a system portion that enables vehicles 12 to recognize traffic control lights 16;

g) a system portion that enables traffic control light mechanisms to recognize other vehicles 12, that determines whether an individual's life is threatened or a crash is imminent, that transmits electrical impulses to stop or shut-down all vehicles 12 receiving the electrical impulses or all involved vehicles 12 or that takes control of threatening vehicles 12;

h) a system portion that enables traffic control light mechanisms to employ artificial intelligence, rendering instantaneous, protective action when undefined, unplanned danger is detected;

i) a self-driving vehicles safety system processor;

j) a self-driving vehicles safety system transmitter in communication with at least one component of the traffic complex;

k) a self-driving vehicles safety system receiver in communication with at least one component of the traffic complex;

l) a system portion that operates in response to information received from at least one component 12, 14, 16 of the traffic complex and that can override an operation of at least one component 12, 14, 16 of the traffic complex;

m) a system portion that detects a presence, direction, distance, and speed of a vehicle 12 by sending out high-frequency waves that are reflected off the vehicle 12;

n) a system portion that monitors prioritized vehicles 12, that compares alert signals received and priority algorithms with predetermined standards, and that gives a go-ahead to prioritized vehicles 12 accordingly;

o) a system portion that scans an environment and that predicts a vehicle's behavior in order to avoid collisions with obstacles;

p) a system portion responsive to electronic tags to vehicles 12 and roadside objects, that collects target mass information to allow reliable pre-collision restraint deployment decisions;

q) a system portion that employs coordinated components and entities, that observes prioritized vehicle codes, that automatically provides information on optimum routing, closed and obstructed roadways and railroad crossings, that preempts traffic control lights 16, and that warns pedestrians 14 of advancing prioritized vehicles 12;

r) a system portion that recognizes traffic signals and advises when it is safe for an individual to cross the street, that senses vehicle movement or imminent danger in immediate surroundings of the individual, and that transmits an electrical impulse to a computer system to stop or shut-down all vehicles 12 receiving the electrical impulse or all involved vehicles 12 or take control of threatening vehicles 12; and s) a system portion that reads, understands, and obeys roadway lines, markings, symbols and signs, that reads, understands and obeys lines, markings, symbols and signs near, under and over the roadways, that reads, understands and obeys traffic control lights 16, and that employs lidar 48 and continuous-wave radar 50 interchangeably as lighting conditions fluctuate for continuous visibility.

The self-driving vehicles safety system 10 further includes an automatic vehicle count and emissions detection and mitigation mechanism 30, wherein the self-driving vehicles safety system 10 of the intelligent video monitoring and video analysis system 46 includes:

a) a continuous-wave radar system portion that can be used to illuminate and detect vehicles 12 by techniques employing semiconductor tracer-diode surveillance utilizing one or two carrier frequencies and looking for reflections of the third harmonic;

b) a vehicle count and emissions detection mechanism system portion that processes information on a number of vehicles 12 and levels of emissions for a given location and time period to determine if dynamic traffic assignment will be executed to preempt traffic control lights 16 to regulate the flow of vehicles 12;

c) a mitigating vehicle emissions system portion that automatically adjusts stop light timing to speed up or reroute vehicle movement and that uses in-vehicle displays and in-vehicle interactive voice communications to relieve congestion;

d) a traffic control light mechanism system portion that determines if dynamic traffic assignment is to be executed and that executes predetermined rerouting instructions, based on real or predicted traffic conditions, as measured by automatic vehicle counts; and e) an automatic, dynamic vehicle count system portion and an infrastructure emissions sensor system portion that senses, identifies and classifies types and levels of emissions in each vehicle 12 to provide safety and vehicle control, to regulate and prioritize traffic, and to reduce vehicle emissions.

In other words, the lidar system 48, the continuous wave radar system 50, the computer vision system 28, and the intelligent video monitoring and video analysis system 46: 1) have, independently from each other, many of the same system portions and/or features and/or can employ many of the same steps, 2) can independently assess the very same situation at the very same time, and 3) can communicate with each of the other systems as to such very same situations, such that 4) mistakes are minimized and safety is maximized.

As to the self-driving vehicles safety system 10 and its features, parts, components, entities, systems, and system portions, the following U.S. Patents are hereby incorporated by reference in their entireties:

1. U.S. Pat. No. 5,973,618 issued to Christ G. Ellis on Oct. 26, 1999 and entitled Intelligent Walking Stick;
2. U.S. Pat. No. 6,218,964 issued to Christ G. Ellis on Apr. 17, 2001 and entitled Mechanical And Digital Reading Pen;
3. U.S. Pat. No. 6,356,210 issued to Christ G. Ellis on Mar. 12, 2002 and entitled Portable Safety Mechanism With Voice Input And Voice Output;
4. U.S. Pat. No. 6,556,148 issued to Christ G. Ellis on Apr. 29, 2003 and entitled Emergency Flashing Light Mechanism;
5. U.S. Pat. No. 7,042,345 issued to Christ G. Ellis on May 9, 2006 and entitled Intelligent Vehicle Apparatus And Method For Using The Apparatus;
6. U.S. Pat. No. 9,062,986 issued to Christ G. Ellis on Jun. 23, 2015 and entitled Guided Movement Platforms;
7. U.S. Pat. No. 9,492,343 issued to Christ G. Ellis on Nov. 15, 2016 and entitled Guided Movement; and
8. U.S. Pat. No. 9,770,382 issued to Christ G. Ellis on Sep. 26, 2017 and entitled Guided Movement.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A self-driving vehicles safety system comprising synthesized and coordinated entities that are functionally distinct from each other and that work in combination, wherein the self-driving vehicles safety system includes a lidar system, a continuous-wave radar system, a computer vision system, and an intelligent video monitoring and video analysis system, wherein the self-driving vehicles safety system includes components that include vehicle components, pedestrian components, traffic control light components, traffic control light mechanism components, and traffic complex components, and wherein the self-driving vehicles safety system includes entities that include other radar and sensor-based system entities, GPS entities, and cell phone technology entities, wherein the computer vision system comprises:

a) a system portion that is disposed in a vehicle as an integral part of the vehicle and that includes built-in or installable computer vision devices that provide high-level understanding of digital images and videos, that provides automatic extraction, analysis and understanding of useful information from a single image or a sequence of images, that develops a theoretical and algorithmic basis to achieve automatic visual understanding, and that incorporates intelligent video monitoring and video analysis to identify objects, analyze motion and extract video intelligence from data gathered by digital image processing systems, visually sensed video, and none visually sensed data employing motion detection video;

b) a system portion that enables vehicles to recognize other vehicles, that determines whether an individual's life is threatened or a crash is imminent, that transmits electrical impulses to stop or shut-down all vehicles receiving the electrical impulses or all involved vehicles or that takes control of threatening vehicles;

c) a system portion that enables vehicles to recognize pedestrians, that determines whether an individual's life is threatened or a crash is imminent, that transmits electrical impulses to stop or shut-down all vehicles receiving the electrical impulses or all involved vehicles or that takes control of threatening vehicles;

d) a system portion that enables vehicles to recognize traffic control lights;

e) a system portion that enables traffic control light mechanisms to recognize other vehicles, that determines whether an individual's life is threatened or a crash is imminent, that transmits electrical impulses to stop or shut-down all vehicles receiving the electrical impulses or all involved vehicles or that takes control of threatening vehicles;

f) a system portion that enables traffic control light mechanisms to employ artificial intelligence, rendering instantaneous, protective action when undefined, unplanned danger is detected;

g) a self-driving vehicles safety system processor;

h) a self-driving vehicles safety system transmitter in communication with at least one component of the traffic complex;

i) a self-driving vehicles safety system receiver in communication with at least one component of the traffic complex;

j) a system portion that operates in response to information received from at least one component of the traffic complex and that can override an operation of at least one component of the traffic complex;

k) a system portion that detects a presence, direction, distance, and speed of a vehicle by sending out high-frequency waves that are reflected off said vehicle;

l) a system portion that monitors prioritized vehicles, that compares alert signals received and priority algorithms with predetermined standards, and that gives a go-ahead to prioritized vehicles accordingly;

m) a system portion that scans an environment and that predicts a vehicle's behavior in order to avoid collisions with obstacles;

n) a system portion responsive to electronic tags to vehicles and roadside objects, that collects target mass information to allow reliable pre-collision restraint deployment decisions;

o) a system portion that employs coordinated components and entities, that observes prioritized vehicle codes, that automatically provides information on optimum routing, closed and obstructed roadways and railroad crossings, that preempts traffic control lights, and that warns pedestrians of advancing prioritized vehicles;

p) a system portion that recognizes traffic signals and advises when it is safe for an individual to cross the street, that senses vehicle movement or imminent danger in immediate surroundings of the individual, and that transmits an electrical impulse to a computer system to stop or shut-down all vehicles receiving the electrical impulse or all involved vehicles or take control of threatening vehicles; and q) a system portion that reads, understands, and obeys roadway lines, markings, symbols and signs, that reads, understands and obeys lines, markings, symbols and signs near, under and over the roadways, that reads, understands and obeys traffic control lights, and that employs lidar and continuous-wave radar interchangeably as lighting conditions fluctuate for continuous visibility.

2. The self-driving vehicles safety system according to claim 1, wherein the self-driving vehicles safety system further includes an automatic vehicle count mechanism component, an emissions detection and mitigation mechanism component, wherein the self-driving vehicles safety system comprises:

a) a continuous-wave radar system portion that can be used to illuminate and detect vehicles by techniques employing semiconductor tracer-diode surveillance utilizing one or two carrier frequencies and looking for reflections of the third harmonic;

b) a vehicle count and emissions detection mechanism system portion that processes information on a number of vehicles and levels of emissions for a given location and time period to determine if dynamic traffic assignment will be executed to preempt traffic control lights to regulate the flow of vehicles;

c) a mitigating vehicle emissions system portion that automatically adjusts stop light timing to speed up or reroute vehicle movement and that uses in-vehicle displays and in-vehicle interactive voice communications to relieve congestion;

d) a traffic control light mechanism system portion that determines if dynamic traffic assignment is to be executed and that executes predetermined rerouting instructions, based on real or predicted traffic conditions, as measured by automatic vehicle counts; and e) an automatic, dynamic vehicle count system portion and an infrastructure emissions sensor system portion that senses, identifies and classifies types and levels of emissions in each vehicle to provide safety and vehicle control, to regulate and prioritize traffic, and to reduce vehicle emissions.

* * * * *